358-84. OR 3,733,430 SR

United States Patent [19] [11] 3,733,430

Thompson et al. [45] May 15, 1973

[54] CHANNEL MONITORING SYSTEM

[75] Inventors: John R. Thompson, Los Angeles; Robert L. Schoenbeck, Santa Monica, both of Calif.

[73] Assignee: RCA Corporation, New York, N.Y.

[22] Filed: Dec. 28, 1970

[21] Appl. No.: 101,818

[52] U.S. Cl..................178/5.1, 325/31, 178/DIG. 13
[51] Int. Cl..................................................H04n 1/44
[58] Field of Search........................178/5.1, DIG. 13; 325/31; 343/6.5 LC; 179/2 AS

[56] References Cited

UNITED STATES PATENTS

| | | | |
|---|---|---|---|
| 3,093,795 | 6/1963 | Jones | 325/31 |
| 3,058,065 | 10/1962 | Freeman et al. | 178/5.1 |
| 3,172,948 | 3/1965 | Rubinstein | 178/5.1 |
| 3,188,384 | 6/1965 | Townsend | 178/5.1 |
| 3,230,302 | 1/1966 | Bruck et al. | 178/DIG. 13 |
| 2,957,046 | 10/1960 | Freeman et al. | 325/31 |
| 3,586,771 | 6/1971 | Hamburger et al. | 178/5.1 |
| 3,676,580 | 7/1972 | Beck | 178/5.1 |
| 3,514,530 | 5/1970 | Simons | 178/5.1 |

*Primary Examiner*—Benjamin A. Borchelt
*Assistant Examiner*—S. C. Buczinski
*Attorney*—Harold Christoffersen & Samuel Cohen

[57] ABSTRACT

A novel remote monitoring system, described in the context of a cable antenna television system, which includes a control monitoring station for interrogating and monitoring various devices in a subscriber's remote site. The interrogation signals are transmitted by means of high frequency FM transmission via a trunk cable to a multitude of remote sites. Each remote site is addressed by a unique code and each remote site stores information indicative of the status of its respective monitored devices. Upon request from the control monitor station, such information is transmitted to the control monitor station by means of low frequency FM transmission via the aforementioned trunk cable.

For tv channel identification, as for pay tv billing, each individual channel is marked with an identification signal which may be stored in the respective subscriber's remote unit until the control monitor station requests such information by interrogating the remote unit. The stored information is transmitted to the control monitor station and transferred to storage means, such as a computer, for billing or for other purposes.

38 Claims, 6 Drawing Figures

INVENTORS
JOHN R. THOMPSON
ROBERT L. SCHOENBECK
BY Henry M. Bissell
ATTORNEY

INVENTORS
JOHN R. THOMPSON
ROBERT L. SCHOENBECK
BY Henry M. Bissell
ATTORNEY

PATENTED MAY 15 1973 3,733,430

SHEET 3 OF 5

INVENTORS
JOHN R. THOMPSON
ROBERT L. SCHOENBECK
BY Henry M. Bissell
ATTORNEY

INVENTORS
JOHN R. THOMPSON
ROBERT L. SCHOENBECK
BY Henry M. Bissell
ATTORNEY

INVENTORS
JOHN R. THOMPSON
ROBERT L. SCHOENBECK
BY Henry M. Bissell
ATTORNEY

CHANNEL MONITORING SYSTEM

BACKGROUND OF THE INVENTION

1. Field of the Invention

This invention relates to a remote monitoring system for cable antenna television systems, and more particularly to a novel monitoring system for interrogating and monitoring various devices located in a subscriber's remote site, for example the television set in a subscriber's home.

2. Description of the Prior Art

Various concepts have been utilized to monitor the operation of a subscriber's television set for different reasons, for example, for billing purposes. Central station monitoring of indicia, such as on/off time, channel setting, etc. has been accomplished by the use of transponders located in the remote sites. Various coding schemes have also been utilized. However, none of the various approaches have developed a monitoring system which can provide monitoring capabilities that cover multiple interrogations of various devices to a large number of subscribers in a relatively short period of time.

Accordingly, it is an object of the present invention to provide an improved monitoring system for interrogating and monitoring various devices located at the subscriber's remote site.

It is a further object of the present invention to provide an improved monitoring system for interrogating and monitoring various devices in a relatively short period of time.

It is still further object of the present invention to provide an improved monitoring system for interrogating and monitoring the operation of a remote television set for the purposes of identifying the on/off time of the television set and the channel to which the set is tuned.

It is another object of the present invention to provide an improved monitoring system for providing opinion polling indicia.

It is still another object of the present invention to provide an improved monitoring system for providing burglary and fire alarm indicia.

SUMMARY OF THE INVENTION

In accordance with the objects set forth above, the present invention provides a novel subscriber monitoring system which includes a control monitor station for interrogating and monitoring various devices at a subscriber's remote site. The interrogation signals are transmitted by means of high frequency FM transmission via a trunk cable to a multitude of remote locations. Each remote site is addressed by a unique code and each remote site stores information indicative of the status of its respective monitored devices. Upon request from the control monitor station, such information is transmitted to the control monitor station by means of a low frequency FM transmission via the aforementioned trunk cable.

As described in the context of a cable antenna television communications system, the basic functions of the system are those associated with channel monitoring. In particular, the channel monitor system of the invention is designed to provide in a central location information indicating the specific subscriber address code, the on/off condition of the television receiver at that address, and identification of the channel to which the set is tuned. A variety of other data may be collected along with the basic channel and address information and processed by the head-end computer in support of other services.

For example, since the information is developed on a real time basis, the head-end computer may compile billing information for pay program service. The specific programs to be charged for may be put on a particular channel of the cable network with the service being interrupted at the subscriber-end junction until a subscriber indicates his desire to accept the program by activating a key-lock switch mechanism and by tuning his set to the programmed channel. With this arrangement in accordance with the invention, inadvertent or unauthorized use of the channel is prevented by means of the lock switch, and non-paying subscribers are prevented from viewing the programming. The continuous real-time monitoring of the pay channel by the system allows the subscriber to be billed only for the time he is actually tuned to that channel. Thus, if the set is switched off or tuned to another channel for which no charge is involved, the subscriber is billed only for the portion of the pay program which he actually received. Where the subscriber is delinquent in payments for the television service, his picture may be selectively degraded to cause him to telephone the central location for service — at which time he is reminded that payment is required or service will be terminated. This is preferable to an abrupt disconnect without warning, possibly in the middle of a program, which adversely affects customer relations. Also reception of pay tv programming may be blocked without interference with free tv channels by selective application of a channel jamming transmitter at the remote unit which is controlled from the central station.

Other digitally encoded information indicative of the status of the subscriber location may be transmitted to the head-end computer for appropriate processing within the system. For example, utility meter reading is feasible as an adjunct to systems in accordance with the invention with the installation of a remote reading meter head between a utility meter and the subscriber cable link. The data of the meter head may be collected on command from the central computer according to its programming requirements and may be either immediately translated into billing statements or stored on some medium such as magnetic or paper tape for later processing. In similar fashion, an alarm sensing device providing a digital code signal may be coupled into the system for providing a warning in the event of fire or burglary. Continuous monitoring of such a device by the central computer provides immediate warning upon the triggering of the alarm at the remote location.

Communication from the subscriber to the central location of the monitoring system is readily available by providing a keyboard device at the subscriber's set. By this means, opinions may be solicited on a real time basis and, upon actuation of the keyboard device by the subscriber, can be collected, tabulated, and read out at the central location. According to a further aspect of the invention, the keyboard may be expanded to provide the capability for allowing a subscriber to make selections for purchase of items which are displayed over specific video channels, thus providing for shopping from one's easy chair and automatic billing by mail.

Other capabilities of systems in accordance with the invention will become apparent from a review of the disclosure herein. Since the channel monitor system of the invention includes the ability to send data to specific addresses as well as collect it, particular commands may be utilized for functions such as remotely connecting or disconnecting a subscriber insofar as video service is concerned. In such a case, other monitoring functions such as subscribed above need not be interfered with unless desired. Moreover, by virtue of the identification capability of the system, the central computer can readily identify a fault associated with any specific remote unit, should one occur, and can then upon remotely isolate such unit from the system so that normal operation of the overall network is not impaired.

In one particular arrangement of a television monitoring system in accordance with the invention, identification of the channel being viewed is developed by having the control monitor station at the central location turn each individual channel off and on in sequence. The timing of channel interruption in this fashion provides the identification signal which is stored in the respective subscriber's remote unit as an identification of the channel being viewed. Upon request to the individual subscriber station for the stored channel information, the stored information is transmitted to the central location and transferred to storage means, such as a computer, for the processing.

In another particular arrangement in accordance with the invention, a subcarrier or marker signal is added to the video information on the respective channels during operation in the scan mode. The subcarrier is the same for all channels, but is applied to each individual channel in accordance with a different timing schedule such that each channel is specifically identified by virtue of being marked within a unique time slot. With this particular arrangement, since channel interruption is not required, there is less likelihood of any disturbance of the television picture as viewed by the subscriber. Moreover, this particular technique permits some relaxation of the system requirements by removing the necessity for a synchronizing signal for the scan cycle.

In each instance, the channel identification stored at the remote location is returned to the central station in the same format, i.e., a mark (e.g. a "1" bit) in a particular time slot, upon demand. It is thus possible to develop the identification of different channels being viewed by different sets at the same remote location, where such information is desired.

BRIEF DESCRIPTION OF THE DRAWING

A better understanding of the present invention may be had from a consideration of the following detailed description, taken in conjunction with the accompanying drawings, in which.

DESCRIPTION OF THE PREFERRED EMBODIMENTS

Figure 1:
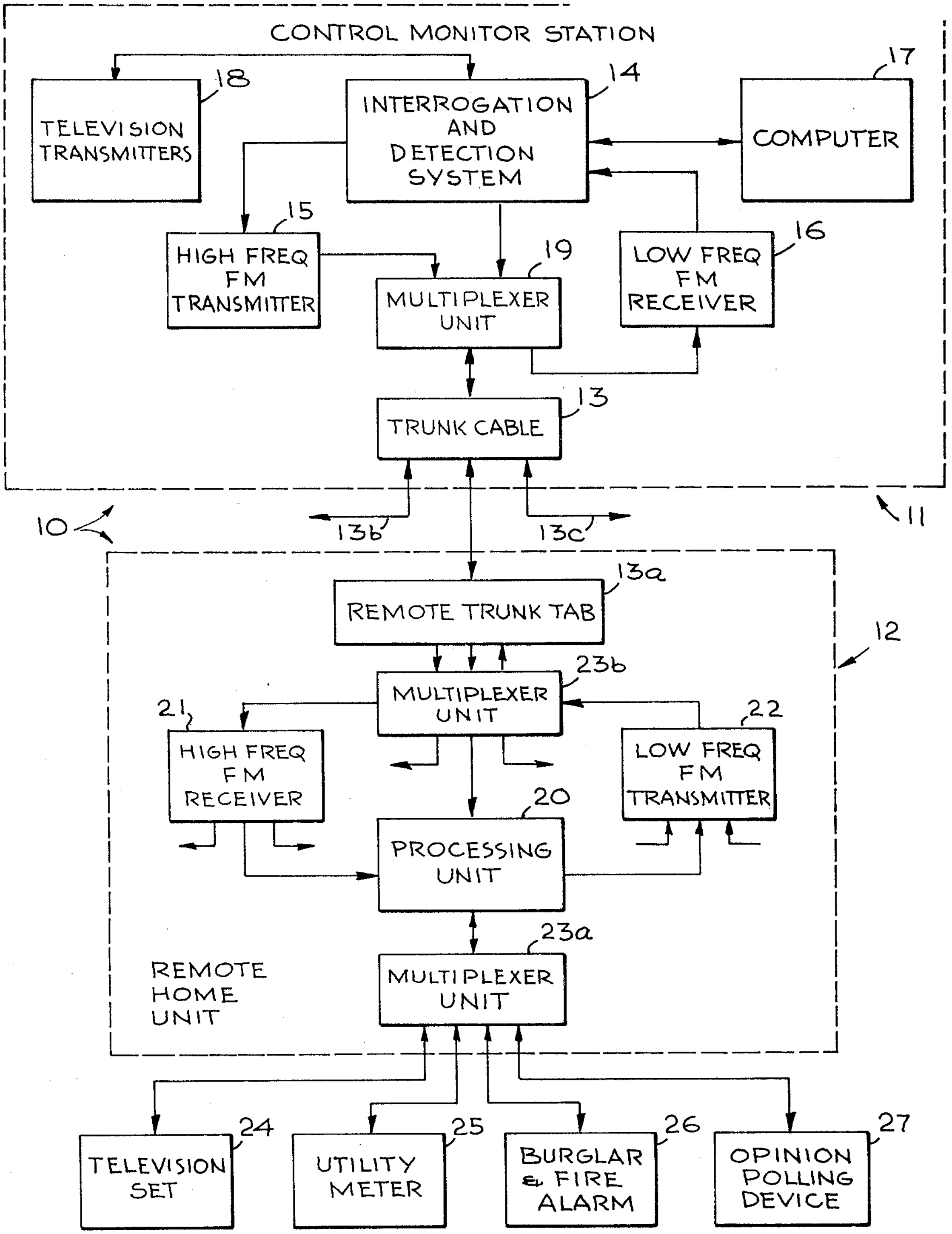
FIG. 1 is a schematic block diagram of a particular subscriber monitoring system in accordance with the present invention.

Referring now to FIG. 1, there is shown a preferred arrangement of a subscriber monitoring system 10 in accordance with the present invention. As shown, the subscriber monitoring system 10 broadly includes a control monitor station 11, a multiple number of remote home units 12 (one of which is shown in FIG. 1) and a trunk cable 13 which connects the control monitor station 11 to the multiple number of remote home units 12. The control monitor station 11 is a central monitoring station which includes equipment for interrogating and monitoring various remotely located devices. It should be understood that the illustrated remote home unit 12, connected to the control monitor station 11 via remote trunk tap 13*a*, represents but one of a multiple number of like remote home units that may be placed in the near vicinity of homes, apartments, etc., and may be connected to the control monitor station 11 by means of respective trunk cable taps as illustrated by the arrows designated 13*b* and 13*c*. Moreover a given unit 12 may serve a plurality (say four or six) residences, sharing in common the FM transmitter 21 and receiver 22 with an individual processor 20 for each residence.

The control monitor station 11 includes an interrogation and detection system 14, a high frequency FM transmitter 15, a low frequency FM receiver 16, a computer 17, one or more television transmitters 18 and a multiplexer unit 19. The remote home unit 12 includes a processing unit 20, a high frequency FM receiver 21, a low frequency FM transmitter 22, and multiplexer units 23*a* and 23*b*. The various subscriber-monitored devices located in a subscriber's home may include a television set 24, a utility meter 25, a burglar and fire alarm 26 and an opinion polling device 27. The video and other information is transmitted from the television transmitter 18 to the television set 24 via the interrogation and detection system 14, the multiplexer unit 23, and remote trunk tap 13*a*.

In the operation of the subscriber-monitoring system 10, the computer 17 may be utilized to collect information such as viewing habits of the subscriber, opinions of the subscriber, the safety condition of the home of the subscriber, the individual consumption rate of various utilities, and the billing for the subscriber's pay-TV time utilized. Such aforementioned information would be transferred to the computer 17 from the interrogation and detection system 14. The interrogation and detection system 14, which will be described in more detail later in this specification, controls the application of television signals to the cable and generates various interrogation signals which are transfered to the high frequency transmitter 15. In turn, such signals are transmitted to the remote home units 12 via the trunk cable 13.

The interrogation signals are received by the processing unit 20 via the high frequency FM receiver 21. The channel setting of the local tv set 24 is determined by timing the "marking" of the different channels. In one particular embodiment, the marking is accomplished by the sequential interruption at the control monitor station 11 of the transmission on the respective channels. The time at which the marking occurs on a particular channel is detected at the remote home unit 12 and is stored in its processing unit 20 along with other information pertaining to the television set 24, the utility meter 25, the burglar and fire alarm 26 and the opinion polling device 27. Such selectively is transmitted to the control monitor station 11 by the low frequency FM transmitter 22 via the trunk cable 13 when requested to do so by the control monitor station. Upon receipt of such transmission, the low frequency FM receiver 16 then relays such information to the interrogation and detection system 14. Such information is then demodulated and transferred to the computer 17, or to other information processing devices as may be utilized.

Figure 2:
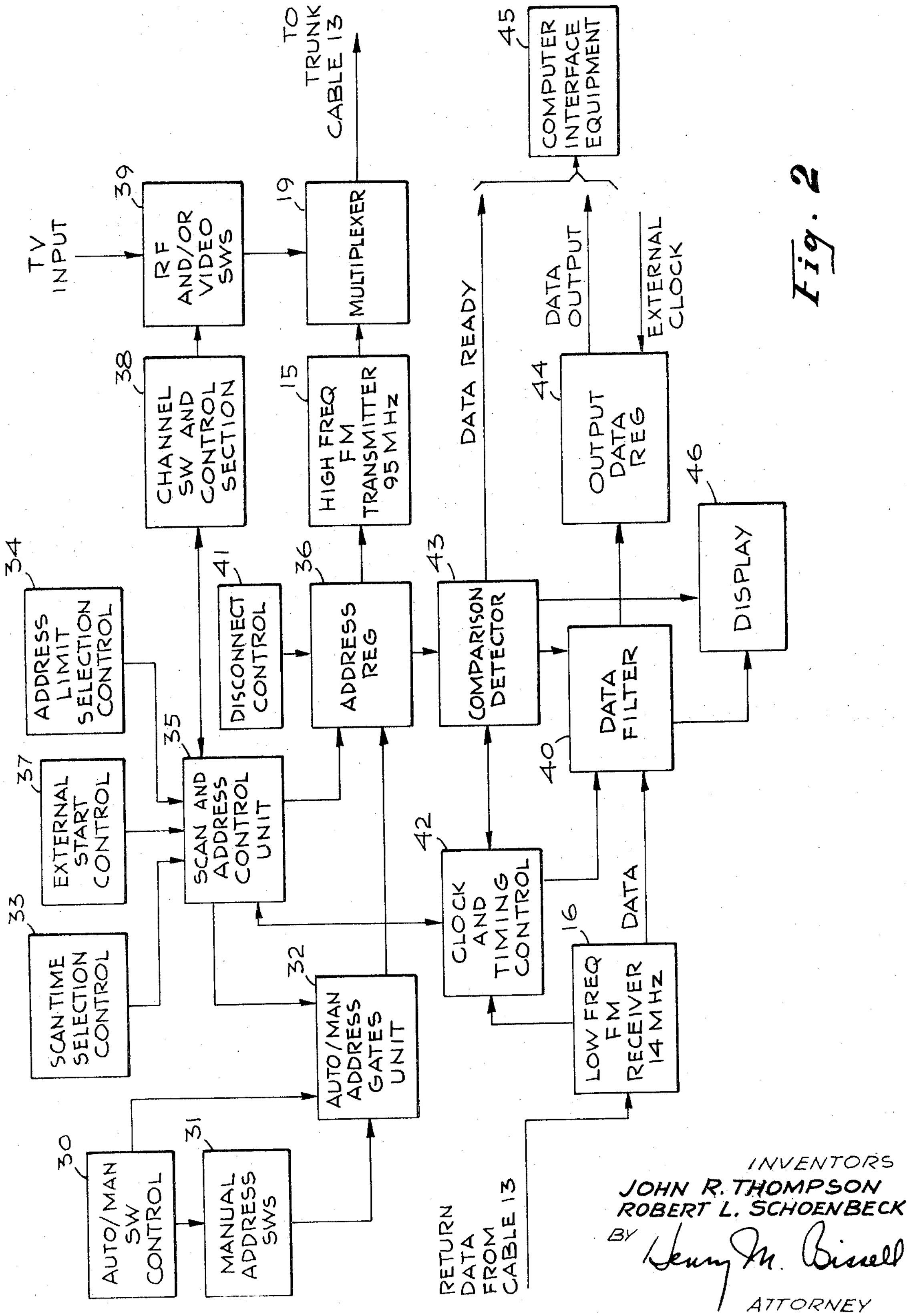
FIG. 2 is a schematic block diagram of the control monitor station of the subscriber monitoring system of FIG. 1.

Referring now to FIG. 2, there is shown a schematic block diagram of the control monitor station 11 of the subscriber monitoring system 10. The control monitor station 11 comprises those components which are used to develop a multiple number of unique addresses in order to interrogate and monitor the various subscriber-monitored devices located in each subscriber's remote site. The unique addresses are transmitted to the respective remote sites via high frequency FM transmission and information corresponding to the address interrogated is received in the control monitor station 11 by means of a low frequency FM receiver. Such information may then be displayed in readout or stored in a computer. In the following description of the subscriber monitoring system 10, particular emphasis will be placed on the television monitoring aspects of such system.

ADDRESS TRANSMISSION

As shown in FIG. 2, a scan and address control unit 35 controls the channel scan and address sequence performed in order to interrogate and monitor the subscriber's remote home unit 12. The various addresses may be set manually or automatically. The manual address switches are represented by the block 31. The auto/manual switch control 30 controls whether an automatic address scan sequence is performed or the address established by the position of manual address switches 31 is performed. An auto/manual address gate unit 32, which includes various AND and OR gates in a suitable logic circuit, establishes the address to be performed by the control monitor station 11.

The established addresses may be fed to an address register 36 upon command of the scan and address control unit 35. The sequence established by the scan and address control unit 35 is controlled by a scan time selection control 33 and an address limit selection control 34, which respectively set the time interval between successive system interrogations. The scan time selection control 33 and the address limit selection control 34 may be mechanized in a similar fashion. For example, in a present arrangement, three thumb-wheel switches allow the time interval to be adjustable from 1 to 999 seconds. A 5-volt 60 Hz signal is utilized as the basic clock source, which is then divided by 60 to produce one-second intervals. The one-second pulse is then counted by three decade counters and comparators are used to compare the count to the three thumbwheel switches, not shown.

The control monitor station 11 controls and generates the address interrogation signals sent to the remote home units 12. One particular arrangement in accordance with the invention has the present capability of interrogating 30,000 remote home units on a single trunk line 13. As stated above, the scan and address control 35 controls the channel scan and address sequence. Upon comparison of the time and limit functions of the scan time selection control 33 and the address limit selection control 34, respectively, with the aforementioned switch settings, the address register 36 is reset and a new scan is initiated. The address zero is used to perform channel viewing interrogation. A reset pulse generated within the external start control 37 sets a control flip-flop of the scan and address control 35 and also sets the second bit of the address register 36. A start trigger is then generated, allowing a 2-bit address to be transmitted at a 42 KHz data rate, such 2-bit address being the sync bit and the channel scan control bit. The "1" bit following the sync bit sets all the remote units into a channel scan mode. At the end of this transmission, a scan interval gate is developed.

When the channel scan cycle has been completed, a start trigger from the external start control 37 is again generated. The address limit selection control 34 is clocked at this time and the contents thereof are loaded into the address register 36. The address to be transmitted is comprised of the following: a sync bit; a zero, which is the scan control bit; a 15-bit address; an even parity bit; and a disconnect control bit. After this address has been loaded into the address register 36, it is clocked into the high frequency FM transmitter 15 at a 42 KHz data rate. The high frequency FM transmitter 15 transmits at 95 MHz. The address is then transmitted to the remote home units 12 and after the control monitor station 11 receives its response from the addressed remote unit, the above described cycle is again repeated for the next address. This process continues until the address limit of the address limit selection control 34 has been achieved.

The scan and address control unit 35 also covers the possibility that a remote unit 12 will not respond. If return data is not received in response to an address within a specified time frame, another start trigger is generated. In such a case, the scan and address control unit 35 is inhibited and the previously transmitted address is transmitted again. If the remote unit does not respond to the second interrogation, that address is considered a fault, and interrogation proceeds to the next address. This procedure ensures that a system lock-up does not occur.

CHANNEL SCAN-CENTRAL

The channel scan occurs at the beginning of every address interrogation cycle. At the end of the scan transmission cycle a scan interval gate signal is developed which allows a binary counter, located within the channel switch and control section 38, to function. A clock, applied to the input of the binary counter, drives the counter at a 675 KHz rate. When a count of 24 is detected, the count is interrupted by a scan stop signal developed within the channel switch and control unit 38. This signal is used to reset a scan control flip-flop of the scan and address control unit 35, which initiates the start trigger starting the address scan cycle as described.

The output of the binary counter is applied to binary coded decimal (BCD)-to-octal decoders of the channel switch and control section 38. The decoders then generate 24 unique codes, each of which represents a television channel. The 24 codes are applied via 48 switch drives within the channel switch and control section 38 to represent a white level and a black level switch for each channel. The output of the 48 switch drives is used to drive video or RF switches as represented by the block designated 39. It should be understood that it is only necessary to apply the output of the 48 switch drives to either video or RF switches. The driving of either video or RF switches is optional and is dependent upon the particular type of television equipment and particular cable system that is utilized. The output of the RF or video switches 39 is multiplexed with the output of the high frequency FM transistor 15 in the multiplexer 19, and the combined output is transmitted to the remote home unit 12 via the trunk cable 13.

In one particular arrangement of the invention, the 24 unique codes are utilized to turn off each television channel for approximately 1 microsecond. Then each television channel is sequentially turned on for 1.4 microseconds. After the twenty-fourth channel has been switched, the video returns to a normal viewing state. The length of time between the initial turn-off and the turn-on of the channel being viewed provides the channel identification for storage in the remote unit 12.

DISCONNECT CONTROL

The disconnect functions in the manual mode of operation. The disconnect control unit 41 generates a pulse which is transmitted after the interrogation address. Two consecutive interrogations of the same address are required in order to change the state of a disconnect flip-flop located in the remote home unit 12. After an address of interest is interrogated, the return data contains the status of its remote disconnect flip-flop. The proper data bit of the return data is then compared with the setting of a front panel switch, not shown. If a comparison does not exist, the disconnect command flip-flop within the disconnect control unit 41 is set. When the address is to be interrogated again, the disconnect control flip-flop in the address register 36 is set. This signal then follows the interrogation address and changes the state of the disconnect flip-flop in the remote unit 12. When a comparison does exist, a zero will be sent by the address disconnect control bit.

DATA RETURN

The block diagram in the lower half of FIG. 1 depicts the components that receive and compare the data that is returned to the control monitor station 11. Such data is received at the control monitor station 11 (upper FIG. 1) by the low frequency FM receiver 16 tuned to the transmitter 22 frequency of 14 MHz. The digital data processed by the receiver 16 is at a 675 KHz data rate. The return data is comprised of the following: a sync pulse; the remote unit's 15-bit address; an even parity bit; 24 bits of channel data; 3 bits of data from the opinion polling device 27; the disconnect control status bit; and 12 spare data bits. Thus, a 56-bit data word, not including the sync bit, is provided for the return data. Assignment of the 12 spare bits may be allocated to other monitored devices, such as, the utility meter 25 and the burglar and fire alarm 26.

When the address transmission from the control monitor 11 is complete, a gate is opened to allow a data filter 40 (FIG. 2) to accept return data from low frequency FM receiver 16. The data filter 40 may comprise 15 8-bit shift registers which are clocked at a 5.3 MHz data rate, such clock pulses being generated in the clock and timing control unit 42. Thus, one 675 KHz data bit uses 8 bits of the data filter 40. The output of each 8-bit shift register is then connected to a comparison detector 43. The comparison detector 43 compares the return data address with the address that was transmitted. When a comparison is established it must hold true for four 5.3 MHz clock pulses. It is at this time that a comparison is acknowledged. A comparison detection pulse is then generated by the unit 43 which allows the complete return data to be clocked into the output data register 44.

When a comparison is detected, a data-ready flip-flop within the output data register 44 is reset, developing a signal condition on the data-ready line to indicate to the computer interface equipment 45 that the output data register 44 is being loaded. At this time an external clock signal is generated by the computer interface equipment and is transmitted to the output data register 44. This external clock signal allows the data contained in the output data register 44 to be transferred to the computer interface equipment 45 and in turn to the computer 17 at the interface clock rate. If the data is removed from the output data register 44 at a slower rate than the rate of the control monitor station, the external start control 37 inhibits the scan and address control 35 until the return data has been removed from the output data register 44. This permits the use of slow speed data processing equipment across the interface.

If no comparison is made in the comparison detector 43 within a preselected time period, an over-ride signal from the clock and timing section 42 is sent to the scan and address control 35 to initiate another address transmission. Of course, this wait time is designed to be longer than the time of any of the system propagation delays. A typical wait time is approximately 400 microseconds.

DISPLAY

Figure 4:
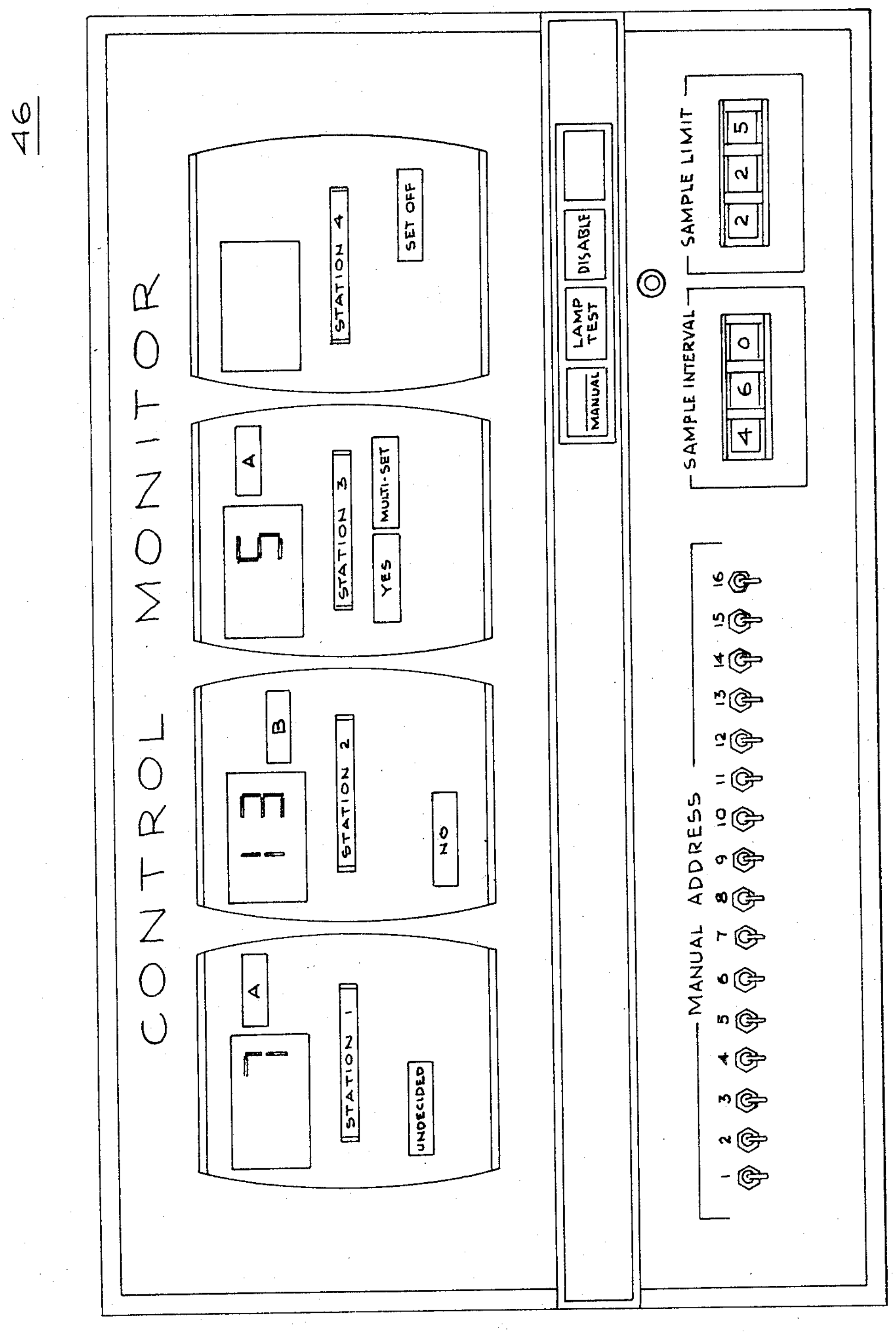
FIG. 4 is a view of the front panel of a particular display unit which may be utilized in systems in accordance with the invention.

A display unit 46 may be utilized to provide a visual presentation of the return data, if desired. The particular display unit shown in FIG. 4 has the capability of displaying data returned from four addresses. For example, the display unit 46 may show the lowest channel viewed as a numeric readout, whether the address has more than one television set, whether the television set is on or off, the existence of a fault, and various opinion polling outputs such as "yes", "no", or "undecided." The unit shown in FIG. 4 also includes some of the controls relating to manual address and scan settings.

REMOTE UNIT

Figure 3:
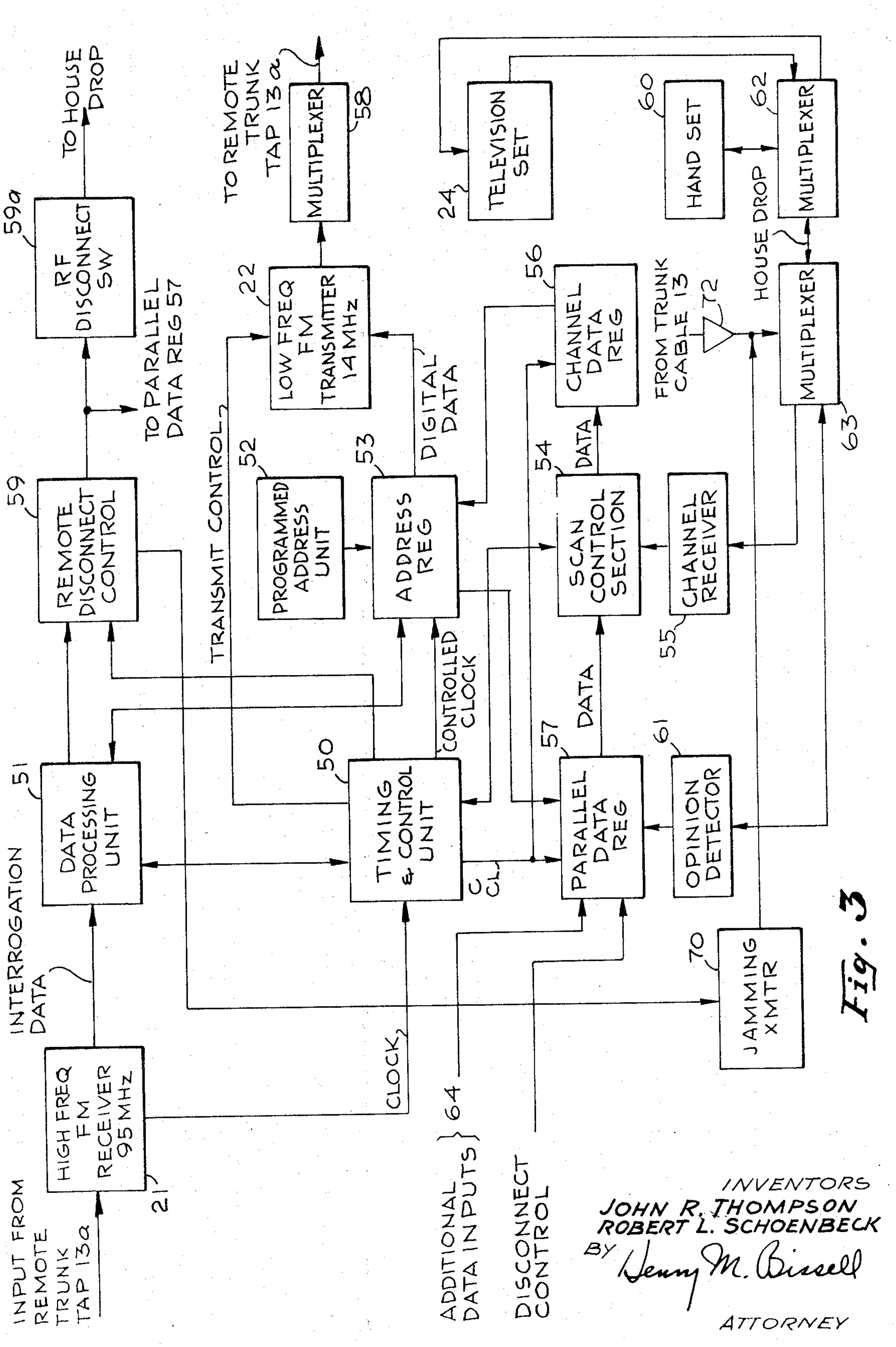
FIG. 3 is a schematic block diagram of the remote home unit of the subscriber monitoring system of FIG. 1.

Referring now to FIG. 3, there is shown a more detailed schematic block diagram of the remote home unit 12. As shown in FIG. 1, the remote home unit 12 generally includes the remote trunk tap 13*a*, the high frequency FM receiver 21, the processing unit 20, the low frequency FM transmitter 22 and the multiplexer unit 23, such aforementioned components being located in proximity of the subscriber's home site. The television set 24 and the opinion polling device 27 are connected to the remote home unit 12 by the multiplexer 23, and the utility meter 25 and the burglar and fire alarm 26 may be connected to the multiplexer 23, as shown in FIG. 1, or may be directly connected to the remote home unit 12, as shown on FIG. 3.

ADDRESSING REMOTE UNIT

As stated before, all of the home remote units 12 may be addressed automatically en masse, or an individual home remote unit 12 may be addressed individually. When the channel scan 2-bit address is utilized, all remote home units 12 will respond, and when a channel scan full 16-bit address is utilized, only one home unit 12 will respond. The single remote home unit 12 response will be discussed first.

The interrogation data is received from the trunk cable 13 by the high frequency FM receiver 21 via the remote trunk tap 13*a*. The high frequency FM receiver 21 operates at 95 MHz. The combination of the input frequency and the local oscillator of the high frequency FM receiver 21 produces a 10.7 MHz clock that is sent to a timing and control unit 50. The output of the high frequency FM receiver 21 produces an interrogation address that is then processed by a data processing unit 51 at a data rate of 42 KHz. Prior to the recognition of the input sync pulse, the home remote unit 12 is in a quiescent state. As soon as the sync pulse has been recognized by the data processing unit 51, the timing and control unit 50 is activated. When one-half of the sync pulse has been received, the timing and control unit 50 is momentarily reset to position the clock pulses in such a manner that the interrogation address will be accepted and clocked at the 50 percent point. During the sync pulse period, the programmed address of the remote home unit 12 is transferred from the programmed address unit 52 to an address register 53.

The programmed address from the programmed address unit 52 is an individual binary number, by voltage level, that is assigned to each remote home unit 12. There is no duplication of numbers in the subscriber monitoring system 10. The assigned number is loaded into the address register 53 from the programmed address unit 52 in parallel.

As the programmed address is being received, the address register 53 is clocked. The address within the address register 53 is then compared with the interrogation address from the control monitor station 11. Such comparison takes place within the data processing section 51. If the addresses do not compare entirely, including the parity bit, a flip-flop will be set. If this flip-flop has been set by the end of the address, the home remote unit 12 returns to a quiescent state. On the other hand, if the comparison is made, the status of the disconnect control pulse is then observed. The remote home unit 12 then proceeds to a transmit mode for transmission of return data.

CHANNEL SCAN-REMOTE

The scan control address operates in the following manner. The second bit, which immediately follows the sync bit, will be "1." This is detected by the scan control section 54, and the timing and control unit 50 is then reset and held. The processing unit 20 waits for the code generated by the interrogation and detecting system 14, as described in the discussion of FIG. 2. The code may be detected by picking up the 45 MHz television set I.F. frequency via an antenna located within the set. A channel receiver 55 receives the antenna information and develops a digital output upon reception of the code. When the first zero occurs, the timing and control unit 50 is then allowed to clock. Twenty-four 675-KHz clock pulses are then generated. The clock pulses that have been generated clock the channel receiver 55 output data into a channel data register 56 via the scan control 54. A "one" condition during the clock interval indicates that the television set 24 is on. The location of a "one" identifies the channel being viewed at the subscriber's home. The data now contained within the channel data register 56 is held for transmission to the control monitor station 11. Such transmission occurs only when a remote home unit 12 is discretely addressed.

DATA TRANSMISSION

The transmission of return data occurs only if a correct 16-bit address is received by the remote home unit 12. For a data-word length of 56 bits, as earlier described in the description of the control monitor station 11, the following sequence of events will occur to accomplish data transmission.

Initially the address register 53 and a parallel data register 57 are loaded. The timing and control unit 50 transfers into a transmit mode. This transfer is accomplished by having the transmit control line turn on the low frequency FM transmitter 22. Two sync pulses are then transmitted, followed by the unique address and the return data, which is transmitted at the previously established 675 KHz data rate. The data sent to the low frequency FM transmitter 22 is also recirculated to preserve the contents of the channel data register 56. The remote home unit 12 returns to its quiescent state at the end of the 56-bit transmission. The output of the low frequency FM transmitter 22 is multiplexed onto the trunk cable 13 (FIG. 1) via a multiplexer 58.

DISCONNECT CONTROL

Referring now to the upper right portion of FIG. 3, there is shown a remote disconnect control 59. The remote disconnect control 59 includes a flip-flop and the associating gating for timing. The disconnect control pulse that follows the address is normally received in the zero state. When a "one" is received in the remote home unit 12, the disconnect flip-flop is clocked. This flip-flop is mechanized as a toggle flip-flop, and the output of the remote disconnect control 59 is utilized in two ways. It is connected as an input to the parallel data register 57 in order to establish the status of the disconnect control in the control monitor station 11. The output is also used by an RF switch 59*a* to connect or disconnect the video of the house drop cable.

OPINION MONITOR

Referring now to the lower left portion of FIG. 3, there are shown two components of an opinion polling device 27, namely, a hand set 60 and an opinion detector 61, located in the subscriber's home and the remote unit 12, respectively. The hand set 60 is connected to a multiplexer 62 in order that its output may be multiplexed within the home prior to its output being transferred to a similar multiplexer 63 which is located in the remote unit 12. The hand set 60 is comprised of four push-button switches, a lamp, a battery, and a small circuit board. The switches are labeled "yes," "no," "undecided," and "cancel." An opinion may be entered into the system by depressing the "yes," "no," or "undecided" switches. The "cancel" button may be utilized to delete a previously entered opinion prior to the transmission of such choice to the control monitor station 11.

Upon the actuation of a switch within the hand set 60, a voltage level is sent to the multiplexer 62 and then to the multiplexer 63; at the same time a lamp is illuminated on the hand set 60 indicative of such choice. The voltage level is detected by the opinion detector 61. The opinion detector 61 is comprised of four voltage comparators and a data storage unit. The outputs of the comparators are used to clock, or clear, temporary storage flip-flops. A decode of the flip-flop generates a sustaining signal which is returned to the home to hold the lamp of the hand set 60 in an illuminated state. Just prior to return data transmission, the contents of the opinion storage flip-flops of the opinion detector 61 are entered into the proper locations of the parallel data register 57. The opinion storage flip-flops are then cleared, the sustaining signal is stopped and the lamp in the hand set 60 goes out, thus completing the opinion cycle.

The utility meter 25 and the burglar and fire alarm 26 may be connected to the parallel data register 57 via the additional data input lines 64, as shown.

Another arrangement in accordance with the invention may include means for selectively preventing a subscriber from receiving any meaningful information over selected channels in his television set. This is useful with respect to pay tv programming, and it also provides the capability of developing a private television communication system under certain circumstances. The system depicted in FIG. 3 includes a jamming transmitter 70 for this purpose. It is coupled to provide an input to the multiplexer 63 on the line from the trunk cable 13. In order that there is no transmission of jamming signals back to the trunk cable 13, an isolation amplifier 72 is included in the line ahead of the connection from the jamming transmitter 70. The jamming transmitter 70 is controlled by the remote disconnect control 59 which itself acts in response to control signals from the central control monitoring station.

An individual jamming transmitter 70 may be activated when a given subscriber has not paid for particular programs on a given channel. This effectively blocks any intelligible information over such a channel from reaching the local television set 24. In another application of the jamming transmitter 70 in conjunction with the system in FIG. 3, a private communication link from the central station to the particular subscriber is provided. For this purpose, all of the jamming transmitters 70 associated with all of the other subscribers except the one particular subscriber who is to receive the communication from the central station are energized. Thus, only the selected subscriber will be able to receive the television information from the central station. Such an application might be appropriate in the case of a medical doctor who might in an emergency be in the position to view a particular operation picked up in the hospital and transmitted over the CATV channel while communicating his instructions or diagnosis to hospital personnel via telephone.

Figure 5:
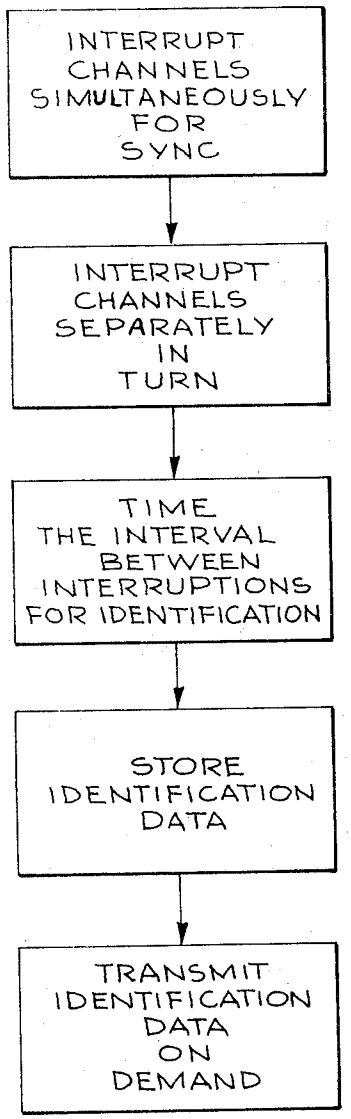
FIG. 5 is a flow diagram illustrating one particular method which may be employed in systems in accordance with the invention for providing channel identification.

One particular manner of providing channel identification during the channel scan mode is illustrated in the flow diagram of FIG. 5. In this method, the marking of the channels involves simultaneous interruption of all of the channels at the control monitor station to provide a synchronizing pulse, or time zero, reference. Subsequently and in sequence, each of the individual channels is marked by being interrupted separately according to a predetermined timing schedule. Equipment at the remote unit times the interval between the initial synchronizing pulse interruption and the subsequent interruption of the individual channel to which that unit is tuned to provide an identification at the remote unit of the particular channel being viewed. That identification data is stored in the remote unit until the unit is interrogated by the application of the unique address which discretely identifies that unit. Thereafter, during the return data transmission mode, the remote unit transmits the channel identification data to the control monitor station for processing along with the other data pertinent to that unit.

In one particular arrangement in accordance with the invention, the operation of the system in the manner described is accomplished by bringing all of the channels to a reference "sync-tip black" level prior to the initial channel interruption. Interruption is then caused by switching the channels to a "white" level. Alternatively, the levels may be reversed so that interruption is effected by switching the channels from "white level" to "black level." The former is referred to as "black line scan" whereas the latter technique is called "white line scan." The black line scan technique is preferable because it makes the interruption interval less noticeable and, therefore, less objectionable to the viewer.

Figure 6:
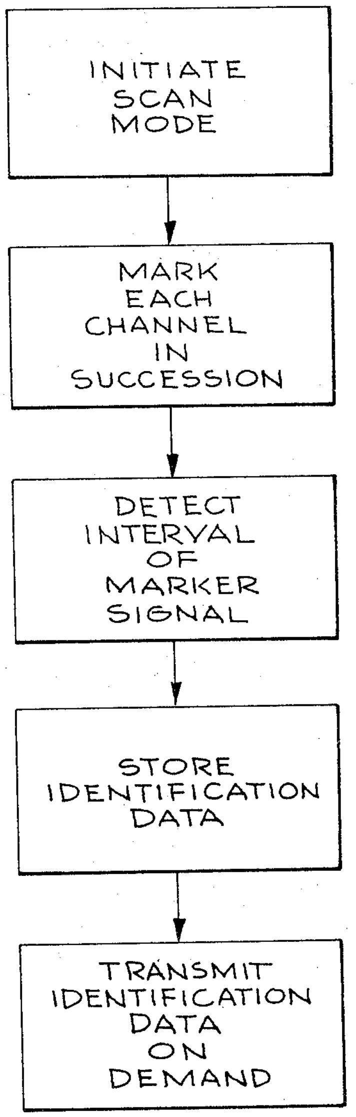
FIG. 6 is a flow diagram illustrating an alternative method for providing channel identification.

Another method of marking the different channels which may be used in systems in accordance with the invention is represented in FIG. 6. In this method, channel interruption is not required in the manner described for FIG. 5. Instead a particular subcarrier or "marker" signal is added to the video information in each channel during the scan mode. This subcarrier is the same switched all channels and is switch on and off in the respective individual channels in accordance with a predetermined timing schedule. Thus, each channel is specifically identified by virtue of being marked within a certain time slot. Preferably this is accomplished by marking all of the channels in succession with the subcarrier signal, immediately after the start of the scan mode. It is not necessary to provide any special synchronization because of the increased duration of the marker signal as long as each channel is marked for a unique interval in accordance with the identification of that channel. The equipment at the remote unit records the specific interval after the start of the scan mode in which the marker signal appears in order to provide an identification of the channel being viewed. That identification data is stored at the remote unit until the unit is interrogated by the control monitoring station, at which time the remote unit transmits the channel identification data and other pertinent data on demand.

The channel identification scheme represented in FIG. 6 is considered to provide an improvement over the methods represented in FIG. 5, particularly in regard to "viewer noticeability." With the technique of FIG. 6, channel interruption is not required. Certain simplifications may be made in the detailed implementation of the system which lead to higher reliability and lower cost. Because the scan period is all but invisible to the viewer with this technique, the time taken for the channel marking function can be greatly lengthened by lowering the clock frequency specified in the description of FIGS. 2 and 3 from 675 KHz to 250 Hz. This removes the necessity of a synchronizing signal for the scan cycle because the delay times within the system now become insignificant with respect to the transmission of the address "sync-bit" and the "scan control bit." By virtue of such simplifications which are realizable with the method of FIG. 6, the probability of interference from one set to another when they are connected to a common drop cable is virtually eliminated.

In both of the methods represented by FIGS. 5 and 6, the operation of the remote unit in its storage and return of channel identification information is essentially the same. That is, the remote unit develops an identification of the channel or channels being viewed by detecting a particular time slot in which the marking signal is received. If more than one channel is being viewed, a plurality of marking signals will be received in the time slots corresponding to those channels. Upon receipt of the interrogation signal from the control monitor station, the interrogated remote unit returns the information in the form in which it has been received and stored, namely it returns a "1" bit in the time slot or slots corresponding to the channel or channels being viewed.

There have thus been described particular arrangements of the channel monitoring and billing system with particular application in cable antenna communication systems such as CATV and the like. Systems in accordance with the invention have a capability of developing, at a central location and on demand, the data which is needed for billing of pay tv programming or utility meter reading, and which is useful for other applications. Such data includes the unique identification of a remote unit and an indication of the particular channel being viewed by the remote subscriber. The data is developed reliably and on an individual basis and is provided to the central station upon demand and in rapid fashion. Thus, a central station has the capability of interrogating an extremely large number of subscribers in rapid fashion so that successive scans can be accomplished with short time intervals between scans. With this capability, the system is feasible for monitoring other functions such as processing information derived from audience opinion polling and the like. Additional functions can be combined with the described features of this system to provide utility meter reading, warning of fire or burglar alarms, and various other accomplishments. Particular encoding approaches have been described hereinabove in disclosing systems of the invention. It will be understood that other codes may be employed as needed in order to expand the capacity of the system or for other purposes without departing from the principles of the invention.

Although there have been described above specific arrangements of a channel monitor and billing system in accordance with the invention for the purposes of illustrating the manner in which the invention may be used to advantage, it will be appreciated that the invention is not limited thereto. Accordingly, any and all modifications, variations or equivalent arrangements which come within the scope of the appended claims should be considered to be a part of the invention.

What is claimed is:

1. In a communication system having a plurality of channels by which information is transmitted from a central station to a plurality of remote stations, each of which remote stations includes equipment having the capability of selecting at least one of said channels for receiving the information on the selected channel, the combination comprising:

means at the central station for marking each of the channels in succession;

means at the remote station for noting the interval at which a selected channel is marked as channel identification data; and means for returning data from the remote station means to the central station.

2. The combination of claim 1 further including means for interrogating a selected remote station to initiate the return of data therefrom.

3. The combination of claim 2 further including storage means at the remote station for storing data including the channel identification data until the remote station is interrogated by the central station.

4. The combination of claim 3 wherein each of the remote stations is uniquely identified and further including means at the central station for selectively interrogating the remote station.

5. The combination of claim 3 further including means at the remote station for identifying each of the separate channels selected at a single remote location by a plurality of receivers at the remote station and for returning said identification to the central station on demand.

6. The combination of claim 1 wherein the data returning means provides channel identification data to the central station on demand in the same format as the marking of the selected channel is received from the central station.

7. The combination of claim 1 further including means for controlling equipment at the remote station in response to signals from the central station.

8. The combination of claim 7 further including means for detecting a fault at a remote station and for signalling the equipment at said remote station to disconnect said station in response to said fault detection.

9. The combination of claim 7 further including means at said remote station for jamming selected ones of said channels to prevent reception of information thereon by said remote station.

10. The combination of claim 9 further including means at the central station for controlling said jamming means.

11. The combination of claim 10 further including means at the central station for controlling a selected remote station receiver to selectively degrade the quality of the information provided by said receiver without jamming the selected channel.

12. The combination of claim 3 further including means at the remote station for developing data signals indicative of selected conditions at the remote station and for presenting said data signals to the storage means for transmission to the central station upon interrogation thereof.

13. The combination of claim 12 wherein said last-mentioned means comprises means for developing data corresponding to the condition of utility meters at the remote location.

14. The combination of claim 12 wherein said last-mentioned means comprises a device operable by an individual at the remote location for communicating to the central location opinions expressed in response to information received from the central station over a selected channel.

15. The combination of claim 14 wherein the communication system comprises a cable antenna television system, further including means for recording opinions of viewers relating to channel information.

16. The combination of claim 15 further including means at the central station for processing data returned from the remote stations.

17. A subscriber monitoring system comprising:

a plurality of monitored devices;

control monitor station means for supplying a plurality of first coded signals for recognition purposes and for initiating the storing of information indicative of the respective status of said monitored devices, and for further supplying a plurality of second coded signals for initiating the transmission of said stored information to said control monitor station means, and means for receiving said stored information;

a plurality of remote receiving means for respectively receiving and responding to at least one of said first coded signals and for storing said information, and for respectively responding to at least one of said second coded signals and transmitting said stored information to said control monitor station means, each said remote receiving means being connected to at least one of said plurality of monitored devices; and coupling means for intercoupling said control monitor station means to said plurality of remote receiving means.

18. A subscriber monitoring system as recited in claim 17 wherein:

said control monitor station means includes a high frequency FM transmitter for transmitting said first and second coded signals, and said means for receiving said stored information is a low frequency FM receiver;

said plurality of remote receiving means each includes a high frequency FM receiver for respectively receiving said first and second coded signals, and a low frequency FM transmitter for transmitting said stored information to said control monitor station means; and said coupling means is a coaxial cable trunk line having at least one coaxial cable branch line connected to each remote receiving means.

19. A subscriber monitoring system as recited in claim 18 wherein:

said monitored devices are television sets;

said control monitor station means includes television signal transmission means for providing television programming to said television sets, means for sequentially marking each television channel, and storage means for recording information indicative of the status of said television sets for billing purposes.

20. A subscriber monitoring system in accordance with claim 18 wherein said first and second coded signals are digital signals and are sequentially transmitted to said plurality of remote receiving means, and each said remote receiving means includes digital means for providing a unique digital output which is compared with said first and second coded signals for recognition and response purposes.

21. A subscriber monitoring system in accordance with claim 20 further including means responsive to the return of data from one remote receiving means for initiating the transmission of said coded signals to the next remote receiving means in sequence.

22. A subscriber monitoring system in accordance with claim 21 including means initiating said transmission to the next remote receiving means in sequence in the event of failure of return of data from a preceding remote receiving means after repeated interrogation thereof.

23. A method of identifying channels selected by respective remote stations of a cable antenna television system for recording at a central station for subscriber monitoring purposes comprising the steps of:

initiating the marking mode;

marking each of the channels in succession;

timing the interval of the marking signal on a selected channel for channel identification;

storing the channel identification data; and transmitting the identification data to the central station on demand therefrom.

24. The method of claim 23 wherein the step of initiating the marking mode comprises interrupting transmission on all of the channels simultaneously for synchronization.

25. The method of claim 24 wherein the step of marking each of the channels in succession comprises sequentially interrupting transmission on each of the channels in turn.

26. The method of claim 23 wherein the step of transmitting identification data to the central station comprises providing a signal in a relative time interval which corresponds to the time interval in which the marking signal on the selected channel was located.

27. In a system which includes local receiver means, and local transmitter means for transmitting to many remote receiver means a plurality of television programs, each program on a different channel, a system for ascertaining which remote receiver means is tuned to which channel comprising, in combination:

means at said local transmitter means for marking, at different times, the transmissions over the different channels;

means at each remote receiver means for producing and storing an indication of the time at which the channel to which it is tuned is marked;

means at said local transmitter means for individually interrogating said remote receiver means; and means at each remote receiver means responsive to the interrogation of that receiver means for transmitting to said local receiver means the indication stored at said remote receiver means.

28. In a system as set forth in claim 27, said means at each remote receiver means for producing and storing an indication comprising means for measuring the time interval between a reference time and the time at which the channel to which it is tuned is marked.

29. In a system as set forth in claim 28, further including means at said local transmitter means for concurrently transmitting to all of said remote receiver means a signal for indicating said reference time.

30. In a system as set forth in claim 29, said means for transmitting a signal for indicating said reference time comprising means for simultaneously interrupting for a short interval of time the transmission on all channels.

31. In a system as set forth in claim 29, said means for transmitting a signal for indicating said reference time comprising means for transmitting said signal at a frequency different than that of any of said channels.

32. In a system as set forth in claim 27, said means at said local transmitter for marking at different times the transmissions over the different channels comprising means for interrupting said transmissions for relatively short, mutually exclusive time intervals.

33. In a system as set forth in claim 27, said means at said local transmitter means for marking at different times, the transmissions over the different channels comprising means for modulating a subcarrier onto the transmission in channel, during discrete, mutually exclusive time intervals.

34. In a system as set forth in claim 27, said means at said local transmitter means for individually interrogating said remote receiver means comprising means for sequentially addressing the respective receiver means during mutually exclusive time intervals.

35. In a system as set forth in claim 27, said means at each remote receiver means for producing and storing an indication including means for producing and storing a binary number indicative of the time at which the channel to which it is tuned is marked.

36. In a system as set forth in claim 35, said means for producing and storing a binary number comprising means for producing and storing a binary number comprising means for producing a number having 1 bit of one value and all remaining bits of the other value, the position of said bit of one value indicating the time at which the channel to which said receiver means is tuned was marked.

37. In a two-way cable television system, in combination:

local transmitter means for, during one period of time, marking, in succession, its transmissions over the different television channels;

a plurality of remote receiver means, each including means for sensing the time at which its channel is marked and for storing an indication of that time; and means in said local transmitter means for, during a succeeding period of time, addressing each of said remote receiver means in succession for obtaining a reading of the indication stored at each remote receiver means.

38. In a two-way system as set forth in claim 37, further including at said local transmitter means, means responsive to the failure to obtain from a local receiver means a reading of the indication stored thereat after a given interval of time for repeating the address of that means a given number of times and, if said reading is still not obtained, for changing said address to that for another remote receiver means.

* * * * *